United States Patent
Teraoka

(10) Patent No.: US 9,453,551 B2
(45) Date of Patent: Sep. 27, 2016

(54) SHOCK ABSORBER

(71) Applicant: KYB Corporation, Tokyo (JP)

(72) Inventor: Takashi Teraoka, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/654,622

(22) PCT Filed: Dec. 18, 2013

(86) PCT No.: PCT/JP2013/083845
§ 371 (c)(1),
(2) Date: Jun. 22, 2015

(87) PCT Pub. No.: WO2014/103821
PCT Pub. Date: Jul. 3, 2014

(65) Prior Publication Data
US 2016/0195153 A1    Jul. 7, 2016

(30) Foreign Application Priority Data
Dec. 26, 2012    (JP) .................. 2012-281971

(51) Int. Cl.
*F16F 9/34* (2006.01)
*F16F 9/49* (2006.01)

(52) U.S. Cl.
CPC ..................... *F16F 9/49* (2013.01)

(58) Field of Classification Search
CPC ............. F16F 9/34; F16F 9/48; F16F 9/465; F16F 9/3484; F16F 9/5126
USPC ............... 188/266.2, 266.3, 275, 285, 282.6, 188/282.8, 315, 322.15
See application file for complete search history.

(56) References Cited

U.S. PATENT DOCUMENTS

| | | | | |
|---|---|---|---|---|
| 5,303,804 | A * | 4/1994 | Spiess | F16F 9/465 188/266.5 |
| 5,551,541 | A * | 9/1996 | Forster | F16F 9/34 188/315 |
| 7,055,661 | B2 * | 6/2006 | Bertrand | F16F 9/48 188/285 |
| 8,479,895 | B2 * | 7/2013 | Heyn | F16F 9/512 188/288 |
| 8,590,680 | B2 * | 11/2013 | Maeda | F16F 9/34 188/282.8 |
| 8,651,252 | B2 * | 2/2014 | Katayama | F16F 9/3484 188/282.6 |
| 8,844,687 | B2 * | 9/2014 | Yu | F16F 9/5126 188/280 |
| 2012/0305352 | A1* | 12/2012 | Yu | F16F 9/5126 188/275 |

FOREIGN PATENT DOCUMENTS

| | | |
|---|---|---|
| JP | 06-101735 A | 4/1994 |
| JP | 08-326824 A | 12/1996 |
| JP | 2000-225823 A | 8/2000 |

* cited by examiner

*Primary Examiner* — Christopher Schwartz
(74) *Attorney, Agent, or Firm* — Rabin & Berdo, P.C.

(57) ABSTRACT

A shock absorber includes a cylinder, a piston, a piston rod, a damping passage, a bypass path, a shutter, a biasing member, and a control spring secured to the cylinder by one end. Another end of the control spring is opposed to the shutter. When the piston exceeds a predetermined position with respect to the cylinder by displacing on the compression-side chamber side, the shutter is pushed by the control spring and closes the bypass path. The control spring is a conical coil spring. The other end side of the control spring has a small diameter. A guide ring, which is slidably in contact with an inner periphery of the cylinder, is mounted to the small-diameter side end of the control spring.

7 Claims, 3 Drawing Sheets

SHOCK ABSORBER

TECHNICAL FIELD

The present invention relates to a shock absorber.

BACKGROUND ART

In a vehicles, such as vans and tracks, which aim to carry humans and burdens, a movable load changes depending on an amount or a weight of a load. In the case where a damping force characteristics of a shock absorber incorporated in a suspension is constant with such vehicle, a ride comfort in the vehicle changes depending on the weight of the movable load. For example, when setting the damping force characteristics of the shock absorber to be optimal in the case of heavy movable load, if the movable load is light, the damping force becomes excessive, resulting in bad ride comfort in the vehicle. In contrast, when setting the damping force characteristics of the shock absorber to be optimal in the case of light movable load, if the movable load is heavy, the damping force becomes insufficient, resulting in bad ride comfort in the vehicle.

Therefore, there has been developed a shock absorber that automatically changes the damping force characteristics sympathizing with the movable load. Such shock absorber includes, for example, a cylinder, a piston, a piston rod, an expansion-side port, a compression-side port, an expansion-side leaf valve, a compression-side leaf valve, piston nuts, bypass paths, a shutter, springs, and control springs. The piston is slidably inserted in the cylinder to partition the inside of the cylinder with an expansion-side chamber and a compression-side chamber. The piston rod is movably inserted into the cylinder and is coupled to the piston. The expansion-side port and the compression-side port are disposed at the piston. The expansion-side leaf valve opens and closes the expansion-side port. The compression-side leaf valve opens and closes the compression-side port. The piston nuts are mounted to the distal end of the piston rod. The bypass paths open from the side portions of the piston nuts to communicate between the expansion-side chamber and the compression-side chamber via the piston rods. The shutter is slidably mounted to the outer periphery of the piston nut to open and close the bypass paths. The springs bias the shutter to the direction of opening the bypass paths. One ends of the control springs are secured to the cylinder while the other ends are opposed to the shutter.

In the case of light movable load with the above-described shock absorber, since the shutter does not abut against the control springs and the bypass paths are kept to be open, the shock absorber outputs a low damping force. In contrast to this, in the case of heavy movable load, the position of the piston sinks downward, and the control springs push the shutter to obstruct the bypass paths. Thus, the shock absorber outputs the high damping force. Thus, the above-described shock absorber can automatically adjust the damping force characteristics according to the movable load (for example, see JP2000-225823A).

SUMMARY OF INVENTION

The above-described shock absorber can achieve the optimum damping force characteristics according to a load of a burden loaded on the vehicle. As a mechanism of mechanically sensing the movable load, the control spring are used. However, the control springs are tubular coiled springs. Therefore, an interference of the control springs to the inner periphery of the cylinder possibly flaws the inner surface of the cylinder.

Flawing the inner surface of the cylinder, which is the sliding surface of the piston, the expansion-side chamber communicates with the compression-side chamber bypassing the outer periphery of the piston due to the flaw at the cylinder. In this case, the shock absorber cannot provide the targeted damping force characteristics, possibly resulting in bad ride comfort in the vehicle.

The present invention has been made in view of the above-described problems, and it is an object of the present invention to provide a shock absorber that can maintain the targeted damping force characteristics and can improve the ride comfort in the vehicle.

According to one aspect of the present invention, a shock absorber includes a cylinder, a piston slidably inserted in the cylinder, the piston partitioning the inside of the cylinder with an expansion-side chamber and a compression-side chamber, a piston rod movably inserted into the cylinder, the piston rod being coupled to the piston, a damping passage disposed at the piston, the damping passage communicating between the expansion-side chamber and the compression-side chamber, a bypass path that bypasses the damping passage, the bypass path communicating between the expansion-side chamber and the compression-side chamber via an inside of the piston rod, a shutter movably mounted to the piston rod in an axial direction, the shutter opening and closing the bypass path, a biasing member that biases the shutter to a direction of opening the bypass path, and a control spring secured to the cylinder by one end, another end of the control spring being opposed to the shutter, wherein when the piston exceeds a predetermined position with respect to the cylinder by displacing on the compression-side chamber side, the shutter is pushed by the control spring and closes the bypass path, the control spring is a conical coil spring, the other end side of the control spring having a small diameter, and a guide ring, which is slidably in contact with an inner periphery of the cylinder, is mounted to the small-diameter side end of the control spring.

DESCRIPTION OF EMBODIMENTS

The following describes an embodiment of the present invention by referring to the attached drawings.

Figure 1:
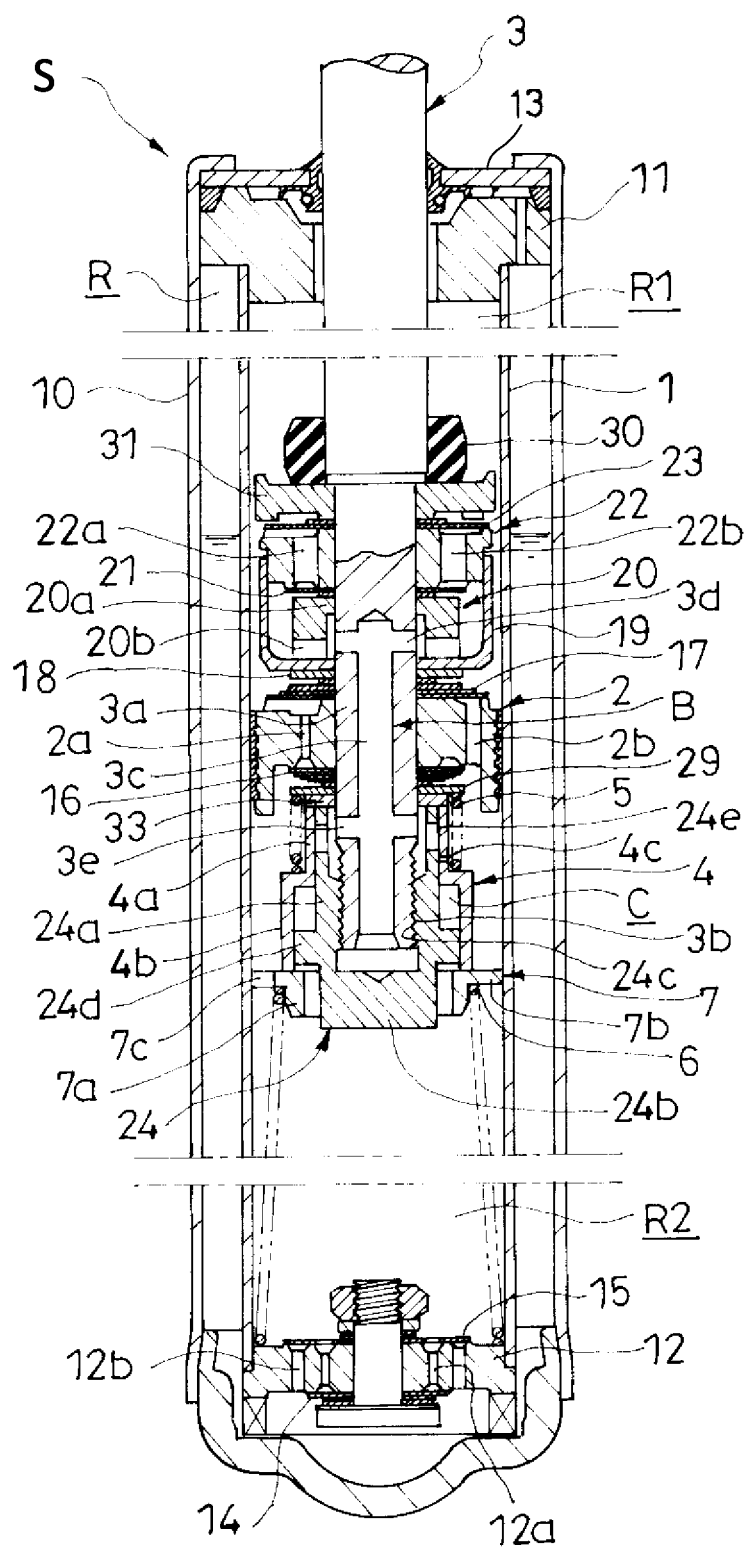
FIG. 1 is a cross-sectional view of a shock absorber according to an embodiment of the present invention.

A shock absorber S of the present invention includes, as illustrated in FIG. 1, a cylinder 1, a piston 2, a piston rod 3, an expansion-side piston passage 2a, a compression-side piston passage 2b, a bypass path B, a shutter 4, a coil spring 5, a control spring 6, and a guide ring 7. The piston 2 is slidably inserted in the cylinder 1 to partition the inside of the cylinder 1 with an expansion-side chamber R1 and a compression-side chamber R2. The piston rod 3 is movably inserted into the cylinder 1 and is coupled to the piston 2. The expansion-side piston passage 2a and the compression-side piston passage 2b are disposed at the piston 2. The expansion-side piston passage 2a and the compression-side piston passage 2b communicate between the expansion-side chamber R1 and the compression-side chamber R2 as damping passages. The bypass path B bypasses the expansion-side piston passage 2a and the compression-side piston passage 2b. The bypass path B communicates between the expansion-side chamber R1 and the compression-side chamber R2 via an inside of the piston rod 3. The shutter 4 is movably mounted to the piston rod 3 in an axial direction. The shutter 4 opens and closes the bypass path B. The coil spring 5 as a biasing member biases the shutter 4 to a direction of opening the bypass path B. The control spring 6 is a conical coil spring. The control spring 6 is secured to the cylinder 1 by one end. The guide ring 7 is slidably inserted in the cylinder 1 and is mounted to the small-diameter side end of the control spring 6. The guide ring 7 is opposed to the lower end in FIG. 1 of the shutter 4. The shock absorber S is, for example, interposed between a vehicle body and axle shafts in a vehicle (not illustrated). The shock absorber S generates damping force to minimize the vibration of the vehicle body. The expansion-side chamber R1 is a chamber compressed when the vehicle body and the axle shafts separate and the shock absorber S is in an expansion operation. The compression-side chamber R2 is a chamber compressed when the vehicle body and the axle shafts approaches and the shock absorber S is in a contraction operation.

The shock absorber S includes an outer pipe 10 in a shape of a cylinder with a closed bottom. The outer pipe 10 covers the outer periphery of the cylinder 1. To an opening end at an upper end in FIG. 1 of the cylinder 1 and the outer pipe 10, an annular head member 11 is mounted. The lower end of the cylinder 1 is obstructed with a valve case 12. An annular shape gap between the outer pipe 10 and the cylinder 1 is formed as a reservoir R. In the expansion-side chamber R1 and the compression-side chamber R2, liquid such as hydraulic oil is filled. Inside the reservoir R is sealed with this liquid and gas.

The upper end in FIG. 1 of the piston rod 3 is slidably journaled with the head member 11 and is projected outside of the cylinder 1. The shock absorber S is a so-called single-rod, twin-tube type shock absorber. An annular sealing member 13 is stacked on the head member 11 to densely seal a part between the piston rod 3 and the outer pipe 10.

The shock absorber S is the so-called single-rod type shock absorber. Accordingly, in association with the expansion and contraction of the shock absorber S, the volume of the piston rod 3, which goes in and out the inside of the cylinder 1, is compensated by supplying the liquid from the reservoir R to the inside of the cylinder 1, or by discharging the liquid from the cylinder 1 to the reservoir R.

In view of this, the valve case 12, which obstructs the lower end in FIG. 1 of the cylinder 1, is provided with a discharge passage 12a and a suction passage 12b. The discharge passage 12a can discharge the liquid from the cylinder 1 to the reservoir R. The suction passage 12b can supply the liquid from the reservoir R to the inside of the cylinder 1.

The discharge passage 12a is provided with a base valve 14. The base valve 14 allows only the flow of liquid from the cylinder 1 to the reservoir R. The base valve 14 gives a resistance to the flow of this liquid to increase the pressure in the cylinder 1 during a contraction operation of the shock absorber S. The suction passage 12b is provided with a check valve 15. The check valve 15 allows only the flow of liquid from the reservoir R to the inside of the cylinder 1. The check valve 15 opens during an expansion operation of the shock absorber S to allow the suction of liquid by the cylinder 1.

The reservoir R is disposed between the outer pipe 10 and the cylinder 1. Besides, the reservoir R may be formed by disposing a tank separately from the cylinder 1. As the liquid to be filled in the expansion-side chamber R1, the compression-side chamber R2, and the reservoir R, for example, liquid such as water and a water solution can also be used in addition to the hydraulic oil. The shock absorber S may be set to not a single-rod type but to double-rod type.

At the piston rod 3, a small-diameter portion 3a is formed on the lower end side in FIG. 1. At the distal end outer periphery of the small-diameter portion 3a, a screw portion 3b is formed. At the piston rod 3, a vertical hole 3c and a first horizontal hole 3d and a second horizontal hole 3e are disposed. The vertical hole 3c opens to the distal end of the small-diameter portion 3a and is disposed in an axial direction of the piston rod 3. The first horizontal hole 3d and the second horizontal hole 3e open to the outer periphery of the small-diameter portion 3a and communicate with the vertical hole 3c.

The piston 2 is annularly formed. The small-diameter portion 3a of the piston rod 3 is inserted into the inner peripheral side of the piston 2. As described above, the piston 2 is provided with the expansion-side piston passage 2a and the compression-side piston passage 2b as damping passages. The expansion-side piston passage 2a and the compression-side piston passage 2b communicate between the expansion-side chamber R1 and the compression-side chamber R2. An expansion-side leaf valve 16 is stacked on the lower surface in FIG. 1 of the piston 2. The expansion-side leaf valve 16 opens and closes the expansion-side piston passage 2a. A compression-side leaf valve 17 is stacked on the top surface in FIG. 1 of the piston 2. The compression-side leaf valve 17 opens and closes the compression-side piston passage 2b.

The expansion-side leaf valve 16 is annularly formed. The inner periphery of the expansion-side leaf valve 16 is secured to the small-diameter portion 3a of the piston rod 3, thus allowing a bending on the outer periphery side. Bending the expansion-side leaf valve 16 opens the expansion-side piston passage 2a. The compression-side leaf valve 17 is annularly formed. The inner periphery of the compression-side leaf valve 17 is secured to the small-diameter portion 3a of the piston rod 3, thus allowing a bending on the outer periphery side. Bending the compression-side leaf valve 17 opens the compression-side piston passage 2b.

While the shock absorber S is in the expansion operation, the expansion-side leaf valve 16 bends and opens by the increasing pressure of the expansion-side chamber R1. The expansion-side leaf valve 16 opens the expansion-side piston passage 2a to provide a resistance to the flow of liquid moving from the expansion-side chamber R1 to the compression-side chamber R2. While the shock absorber S is in the contraction operation, the expansion-side leaf valve 16 obstructs the expansion-side piston passage 2a. The compression-side leaf valve 17, in contrast to the expansion-side leaf valve 16, opens the compression-side piston passage 2b while the shock absorber S is in the contraction operation to provide a resistance to the flow of liquid moving from the compression-side chamber R2 to the expansion-side chamber R1. During the expansion operation, the compression-side leaf valve 17 obstructs the compression-side piston passage 2b.

That is, the expansion-side leaf valve 16 is a damping force generating element that generates expansion-side damping force during the expansion operation of the shock absorber S. The compression-side leaf valve 17 is the damping force generating element that generates compression-side damping force during the contraction operation of the shock absorber S.

It should be noted that, even if the expansion-side leaf valve 16 and the compression-side leaf valve 17 close to the expansion-side piston passage 2a and the compression-side piston passage 2b, respectively, well-known orifice and choke (not illustrated) communicate between the expansion-side chamber R1 and the compression-side chamber R2. The orifice and the choke are formed by, for example, disposing cutouts at the outer peripheries of the expansion-side leaf valve 16 and the compression-side leaf valve 17 or are disposed at the piston 2.

At the outer periphery of the small-diameter portion 3a of the piston rod 3 and below the expansion-side leaf valve 16 in FIG. 1, an annular valve stopper 29 is stacked. The valve stopper 29 restricts an amount of bending of the expansion-side leaf valve 16. At the outer periphery of the small-diameter portion 3a of the piston rod 3 and above the compression-side leaf valve 17 in FIG. 1, an annular valve stopper 18 is stacked. The valve stopper 18 restricts the amount of bending of the compression-side leaf valve 17.

At above the valve stoppers 18 in FIG. 1, in the order from the valve stopper 18 side, a case 19 in a shape of a cylinder with a closed bottom, an annular spacer 20, an expansion-side damping valve 21, an annular partition member 22, and a compression-side damping valve 23 are stacked on and assembled to the small-diameter portion 3a of the piston rod 3. The small-diameter portion 3a is inserted into the bottom portion of the case 19. The spacer 20 has a tubular shape and is mounted at the outer periphery of the small-diameter portion 3a. The partition member 22 is mounted to the outer periphery of the small-diameter portion 3a and fitted to the opening end of the case 19.

The spacer 20 includes a flange 20a and a communication hole 20b. The flange 20a is disposed at the upper end in FIG. 1 of the inner periphery of the spacer 20 and fits the outer periphery of the small-diameter portion 3a. The communication hole 20b communicates between the inner peripheral side and the outer periphery side. The spacer 20 is stacked on the bottom portion of the case 19 and the case 19 and the spacer 20 are secured to the small-diameter portion 3a. Accordingly, the spacer 20 faces the first horizontal hole 3d disposed at the piston rod 3. Through the communication hole 20b, the vertical hole 3c communicates with the inside of the case 19.

The partition member 22 has an annular shape and fits the outer periphery of the small-diameter portion 3a. The lower end in FIG. 1 of the outer periphery of the partition member 22 fits the opening end of the case 19, thus partitioning the inside of the case 19 and the expansion-side chamber R1. The partition member 22 includes an expansion-side port 22a and a compression-side port 22b. The expansion-side port 22a and the compression-side port 22b communicate between the inside of the case 19 and the expansion-side chamber R1.

The expansion-side damping valve 21 is an annular leaf valve. The expansion-side damping valve 21 is stacked on the lower surface in FIG. 1 of the partition member 22. The inner periphery of the expansion-side damping valve 21 is secured to the outer periphery of the small-diameter portion 3a. The expansion-side damping valve 21 closes the lower end in FIG. 1 of the expansion-side port 22a. Bending the outer periphery side of the expansion-side damping valve 21 opens the expansion-side port 22a. That is, the expansion-side damping valve 21 allows only the flow of liquid from the expansion-side chamber R1 to the inside of the case 19, thus providing the resistance to this flow of liquid.

The compression-side damping valve 23 is an annular leaf valve. The compression-side damping valve 23 is stacked on the top surface in FIG. 1 of the partition member 22. The inner periphery of the compression-side damping valve 23 is secured to the outer periphery of the small-diameter portion 3a. The compression-side damping valve 23 closes the upper end in FIG. 1 of the compression-side port 22b. Bending the outer periphery side of the compression-side damping valve 23 opens the compression-side port 22b. That is, the compression-side damping valve 23 allows only the flow of liquid from the inside of the case 19 to the expansion-side chamber R1 the, thus providing the resistance to this flow of liquid.

To the outer periphery of the small-diameter portion 3a of the piston rod 3, the compression-side damping valve 23, the partition member 22, the expansion-side damping valve 21, the spacer 20, the case 19, the valve stopper 18, the compression-side leaf valve 17, the piston 2, the expansion-side leaf valve 16, the valve stopper 29, and the annular stopper 33 are assembled in this order and then are secured with a piston nut 24 screwed with the screw portion 3b.

To the small-diameter portion 3a of the piston rod 3, an annular cushion stopper 31 is mounted above the compression-side damping valve 23 in FIG. 1 to support a cushion 30. The cushion 30 restricts a full expansion position of the shock absorber S. In this embodiment, the cushion stopper 31 can also be secured with the piston nut 24 together with the respective members. This allows the cushion stopper 31 to be secured to the piston rod 3 without the need for a troublesome process such as a welding of the cushion stopper 31.

The piston nut 24 has the shape of a cylinder with a closed bottom. The piston nut 24 includes a pipe portion 24a and a bottom portion 24b and functions as a shutter supporting member. The piston nut 24 includes a screw portion 24c, a flange 24d, and a through hole 24e. The screw portion 24c is disposed at the inner periphery of the pipe portion 24a and is screwed with the screw portion 3b, which is disposed at the outer periphery of the small-diameter portion 3a of the piston rod 3. The flange 24d is disposed at the lower outer periphery in FIG. 1 of the pipe portion 24a. The through hole 24e is disposed on the upper side in FIG. 1 with respect to the screw portion 24c of the pipe portion 24a. The through hole 24e communicates between the inner peripheral side and the outer periphery side of the pipe portion 24a.

The through hole 24e is opposed to the second horizontal hole 3e of the piston rod 3 in a state where the piston nut 24 is screwed with the screw portion 3b of the piston rod 3 and the respective members assembled to the piston rod 3 are secured to the piston rod 3. The vertical hole 3c communicates with the compression-side chamber R2 via the through hole 24e. The piston nut 24 has the bottom portion 24b. Accordingly, the vertical hole 3c, which opens from the lower end in FIG. 1 of the piston rod 3, does not directly communicate with the compression-side chamber R2 except for via the through hole 24e.

As described above, the vertical hole 3c, which is disposed in the piston rod 3, communicates with the expansion-side chamber R1 via the inside of the case 19, the expansion-side port 22a, and the compression-side port 22b and communicates with the compression-side chamber R2 via the through hole 24e. That is, the expansion-side port 22a, the compression-side port 22b, the inside of the case 19, the first horizontal hole 3d, the vertical hole 3c, the second horizontal hole 3e, and the through hole 24e bypass the expansion-side piston passage 2a and the compression-side piston passage 2b as the damping passages and form the bypass path B that communicate between the expansion-side chamber R1 and the compression-side chamber R2. The through hole 24e forms the outlet end of the bypass path B.

At the outer periphery of the pipe portion 24a of the piston nut 24, the shutter 4 is slidably mounted to the vertical direction in FIG. 1, which is the axial direction of the piston rod 3. That is, the shutter 4 is mounted to the piston rod 3 via the piston nut 24.

The shutter 4 has a tubular shape and includes a small-diameter pipe portion 4a, a large-diameter pipe portion 4b, and a reduced passage 4c. The small-diameter pipe portion 4a is disposed on the upper end side and the large-diameter pipe portion 4b is disposed on the lower end side in FIG. 1. The reduced passage 4c communicates between the inner peripheral side and the outer periphery side of the small-diameter pipe portion 4a. The shutter 4 brings the small-diameter pipe portion 4a slidably in contact with the outer periphery of the pipe portion 24a of the piston nut 24 and upward in FIG. 1 with respect to the flange 24d. Additionally, the shutter 4 brings the large-diameter pipe portion 4b slidably in contact with the outer periphery of the flange 24d. Thus, the shutter 4 is mounted to the outer periphery of the piston nut 24.

The shutter 4 disposes the small-diameter pipe portion 4a on the upper side in FIG. 1 with respect to the flange 24d of the piston nut 24, and the small-diameter pipe portion 4a is mounted to the piston nut 24. Accordingly, a limit of downward movement in FIG. 1 of the shutter 4 is restricted by a collusion between the flange 24d and the lower end at the inner periphery of the small-diameter pipe portion 4a. This prevents the shutter 4 from dropping off from the piston nut 24. When the shutter 4 moves until it is abutted against the lower surface in FIG. 1 of an annular stopper 33, the upward movement in FIG. 1 of the piston nut 24 is restricted any further. The stopper 33 is stacked to the lower side in FIG. 1 of the valve stopper 29 and is secured to the piston rod 3 with the piston nut 24. The stopper 33 can be used for adjusting the axial position of the piston nut 24 with respect to the piston rod 3. The axial position changes by a stacking count of the expansion-side leaf valve 16 and the compression-side leaf valve 17, which are stacked on the piston 2, and the expansion-side damping valve 21 and the compression-side damping valve 23, which are stacked on the partition member 22. This embodiment includes the stopper 33. However, regarding the restriction of the limit of upward movement in FIG. 1 of the shutter 4, the stopper 33 may be omitted and the restriction may be performed by the valve stopper 29.

The shutter 4 axially moves to the piston nut 24. The small-diameter pipe portion 4a of the shutter 4 completely covers the through hole 24e, which is disposed at the piston nut 24, to close the bypass path B. In a state where the small-diameter pipe portion 4a is positioned downward in FIG. 1 with respect to the through hole 24e, the shutter 4 allows communication between the through hole 24e and the compression-side chamber R2 to open the bypass path B.

Between the inner periphery of the shutter 4 and the outer periphery of the piston nut 24, a sump chamber C is formed. Making the lower end in FIG. 1 of the inner periphery of the small-diameter pipe portion 4a far from and close to the top surface in FIG. 1 of the flange 24d of the piston nut 24 expands and contracts the volume of the sump chamber C. The sump chamber C is communicated with the inside of the compression-side chamber R2 via a sliding gap formed by the inner periphery of the small-diameter pipe portion 4a of the shutter 4 and the pipe portion 24a of the piston nut 24 and the reduced passage 4c. The reduced passage 4c is disposed at the position not directly opposed to the through hole 24e.

The coil spring 5 as a biasing member biases the shutter 4 downward in FIG. 1. Specifically, the coil spring 5 is compressively interposed between the upper end in FIG. 1 of the outer periphery of the large-diameter pipe portion 4b of the shutter 4 and the valve stopper 29. The coil spring 5 always biases the shutter 4 downward in FIG. 1.

In a state where the shutter 4 is not in contact with the control spring 6, which will be described later, the flange 24d of the piston nut 24 abuts against the lower end in FIG. 1 of the inner periphery of the small-diameter pipe portion 4a. This determines the position of the shutter 4 at the most downward where the shutter 4 cannot move downward in FIG. 1 with respect to the piston nut 24 any further. Thus, in a state where the shutter 4 compresses the sump chamber C most, the shutter 4 is not opposed to the through hole 24e and opens the bypass path B.

Since the outlet end of the bypass path B is disposed at the piston nut 24, the shutter 4 is installed to the piston rod 3 via the piston nut 24. Meanwhile, in the case where the piston nut 24 is not required and the outlet end of the bypass path B is disposed at the piston rod 3, the shutter 4 can also be directly installed to the piston rod 3 so as to be slidable in the axial direction of the piston rod 3.

The control spring 6 is a conical coil spring whose lower end, which is one end, in FIG. 1 is radially expanded. This one end is press-fitted to the inner periphery of the cylinder 1 and is secured to the lower end of the cylinder 1. At the inner periphery of the upper end, which is the other end, in FIG. 1 of the control spring 6, the guide ring 7 is mounted.

The guide ring 7 is made of synthetic resin. The guide ring 7 is provided with a tubular press-fitted portion 7a, a guiding portion 7b, and a plurality of cutouts 7c. The press-fitted portion 7a is press-fitted to the inner periphery of the upper end in FIG. 1 of the control spring 6. The guiding portion 7b outwardly projects from the one end of the press-fitted portion 7a to be slidably in contact with the inner periphery of the cylinder 1. The guiding portion 7b is also supported to the upper end in FIG. 1, which is a small-diameter side end of the control spring 6. The cutouts 7c are circumferentially disposed at the guiding portion 7b at regular intervals.

The inner diameter of the press-fitted portion 7a of the guide ring 7 is set lager than the outer diameter of the lower end in FIG. 1 of the pipe portion 24a of the piston nut 24. This configuration accommodates such that the guide ring 7 does not interfere with the piston nut 24. Furthermore, the upper end in FIG. 1 of the guiding portion 7b of the guide ring 7 is opposed to the lower end in FIG. 1 of the large-diameter pipe portion 4b of the shutter 4. The cutouts 7c are disposed at the guiding portion 7b to prevent forming a closed space below in FIG. 1 in the compression-side chamber R2 by the guiding portion 7b and the shutter 4 when the guiding portion 7b abuts against the shutter 4 and adversely affecting the operation of the shock absorber S.

Accordingly, the shock absorber S contracts until the guiding portion 7b of the guide ring 7 abuts against the large-diameter pipe portion 4b of the shutter 4. Furthermore, when the control spring 6 presses up the shutter 4 upward in FIG. 1 with respect to the piston nut 24 and the small-diameter pipe portion 4a of the shutter 4 covers the through hole 24e, the bypass path B is cut off.

When the piston 2 exceeds a predetermined position with respect to the cylinder 1 by displacing on the compression-side chamber R2 side, the shutter 4 abuts on the guide ring 7. The length of the control spring 6 and the length of the shutter 4 can adjust the predetermined position. In contrast, in the case where the guide ring 7 does not abut on the shutter 4, the control spring 6 does not push the shutter 4. Accordingly, as described above, the state where the coil spring 5 presses down the shutter 4 downward in FIG. 1 is maintained, thus opening the bypass path B.

The guide ring 7 is slidably in contact with the inner periphery of the cylinder 1. The guide ring 7 determines the position of the upper end in FIG. 1 of the control spring 6 radially in the cylinder 1. Even if a vibration or a similar obstacle is input to the shock absorber S, this does not cause a swing of the upper end of the control spring 6 and can prevent interference by the control spring 6 to the inner periphery of the cylinder 1. The shape of the guiding portion 7b may not be an annular shape. The guiding portion 7b is only necessary to have a shape that can determine the position of the upper end of the control spring 6 radially with respect to the cylinder 1.

The following describes operations of the shock absorber S.

First, assume the case where the guide ring 7 does not abut on the shutter 4, that is, the piston 2 strokes with respect to the cylinder 1 to the compression-side chamber R2 side within the range up to the predetermined position. Since the control spring 6 does not push the shutter 4, the bypass path B is always open.

In association with the expansion and contraction of the shock absorber S, liquid comes and goes between the expansion-side chamber R1 and the compression-side chamber R2. In this case, the bypass path B is maintained in the open state. Accordingly, during the expansion operation, not only the liquid opens the expansion-side leaf valve 16 and passes through the expansion-side piston passage 2a as the damping passage but also opens the expansion-side damping valve 21 to move from the expansion-side chamber R1 to the compression-side chamber R2 via the bypass path B.

In contrast, during the contraction operation, not only the liquid opens the compression-side leaf valve 17 and passes through the compression-side piston passage 2b as the damping passage but also opens the compression-side damping valve 23 to move from the compression-side chamber R2 to the expansion-side chamber R1 via the bypass path B.

Thus, in the case where the piston 2 strokes to the cylinder 1 on the compression-side chamber R2 side within the range up to the predetermined position, the shock absorber S causes the liquid to come and go between the expansion-side chamber R1 and the compression-side chamber R2 not only via the expansion-side piston passage 2a and the compression-side piston passage 2b as the damping passages but also the bypass path B, ensuring providing a low damping force.

Assume the case where many loads are loaded up to a vehicle applying the shock absorber S, the movable load increases, and this causes the piston 2 to exceed the predetermined position with respect to the cylinder 1 by displacing on the compression-side chamber R2 side. Then, the control spring 6 presses up the shutter 4 to obstruct the bypass path B.

In this case, during the expansion operation of the shock absorber S, the liquid opens the expansion-side leaf valve 16, passes through only the expansion-side piston passage 2a as the damping passage, and moves from the expansion-side chamber R1 to the compression-side chamber R2. During the contraction operation, the liquid opens the compression-side leaf valve 17, passes through only the compression-side piston passage 2b as the damping passage, and moves from the compression-side chamber R2 to the expansion-side chamber R1. Accordingly, the shock absorber S provides the damping force higher than the damping force output in a state where the bypass path B is open. Accordingly, as the movable load increases, the shock absorber S can automatically increase the damping force and can automatically adjust the damping force characteristics.

During the expansion and contraction of the shock absorber S, in particular, in a condition where the control spring 6 is away from the shutter 4 so as not to push the shutter 4 during the expansion operation where the piston 2 moves upward in FIG. 1 with respect to the cylinder 1, and the control spring 6 presses the shutter 4 during the contraction operation. In this case, a state where the control spring 6 pushes the shutter 4 upward in FIG. 1 and a state where the coil spring 5 pushes the shutter 4 downward in FIG. 1 are repeated. This repeatedly expands and contracts the sump chamber C, which is formed between the shutter 4 and the piston nut 24.

The sump chamber C is communicated with the inside of the compression-side chamber R2 via the sliding gap, which is formed between the inner periphery of the small-diameter pipe portion 4a of the shutter 4 and the pipe portion 24a of the piston nut 24, and the reduced passage 4c. Accordingly, the sliding gap and the reduced passage 4c suppress steep flow of the liquid. This restricts the expansion and contraction of the sump chamber C, also restricting a steep displacement of the shutter 4 to the piston nut 24.

Accordingly, in the case where the shock absorber S vibrates around the piston position when the movable load causes the piston 2 to exceed the predetermined position with respect to the cylinder 1 by displacing on the compression-side chamber R2 side, normally, the shutter 4 obstructs the bypass path B. That is, even if the coil spring 5 pushes the shutter 4 by the expansion operation of the shock absorber S, the displacement of the shutter 4 slows. This allows inhibiting the opening of the bypass path B and the switching of the damping force characteristics, resulting in reducing the low damping force.

In the case where the movable load is light, the piston 2 is in the range of the expansion-side chamber R1 side more than the predetermined position with respect to the cylinder 1 and the shock absorber S vibrates around the piston position, normally, the bypass path B is open. That is, even if the control spring 6 pushes the shutter 4 by the contraction operation of the shock absorber S, the displacement of the shutter 4 slows. This allows inhibiting the obstruction of the bypass path B and the switching of the damping force characteristics, resulting in reducing the increase in damping force.

With the shock absorber S, the control spring 6 is the conical coil spring whose diameter on the other end side is a small. This prevents the interference to the cylinder 1 even if the diameter of the control spring 6 bulges during contraction. The guide ring 7, which is slidably in contact with the inner periphery of the cylinder 1, is installed to the small-diameter side end of the control spring 6. This allows preventing the control spring 6 from swinging and the interference to the inner periphery of the cylinder 1 by the outer periphery of the control spring 6. Thus, the shock absorber S never damages the inner periphery of the cylinder 1, which is a sliding surface to which the piston 2 slides. Accordingly, a flaw generated at the inner periphery of the cylinder 1 does not cause the expansion-side chamber R1 to communicate with the compression-side chamber R2 across the piston 2. This allows providing the targeted stable damping force over a long period of time, also achieving good ride comfort in the vehicle.

Additionally, the guide ring 7 is made of the synthetic resin, and the control spring 6 pushes the shutter 4 via the guide ring 7. This allows avoiding the control spring 6 to directly abut against the shutter 4, allowing reducing contact noise. If not requiring the reduction in contact noise, to avoid the interference with the cylinder 1, it is only necessary that the guide ring 7 is installed to the control spring 6. Directly pressing the shutter 4 by the control spring 6 is also possible.

The expansion-side damping valve 21 and the compression-side damping valve 23 are disposed at the bypass path B. Accordingly, in a state where the bypass path B is open while the movable load is light and therefore the shock absorber S provides the low damping force, the damping force characteristics during the expansion operation and the damping force characteristics during the contraction operation can be set separately and independently. This allows achieving the damping force characteristics more appropriate to the vehicle, ensuring improving the ride comfort in the vehicle.

The piston nut 24 is configured as the shutter supporting member. Accordingly, when securing the expansion-side leaf valve 16 and the compression-side leaf valve 17 to the piston rod 3 with the piston nut 24, the shutter 4 can also be assembled to the piston rod 3 at the same time, considerably facilitating the assembly work.

Figure 2:
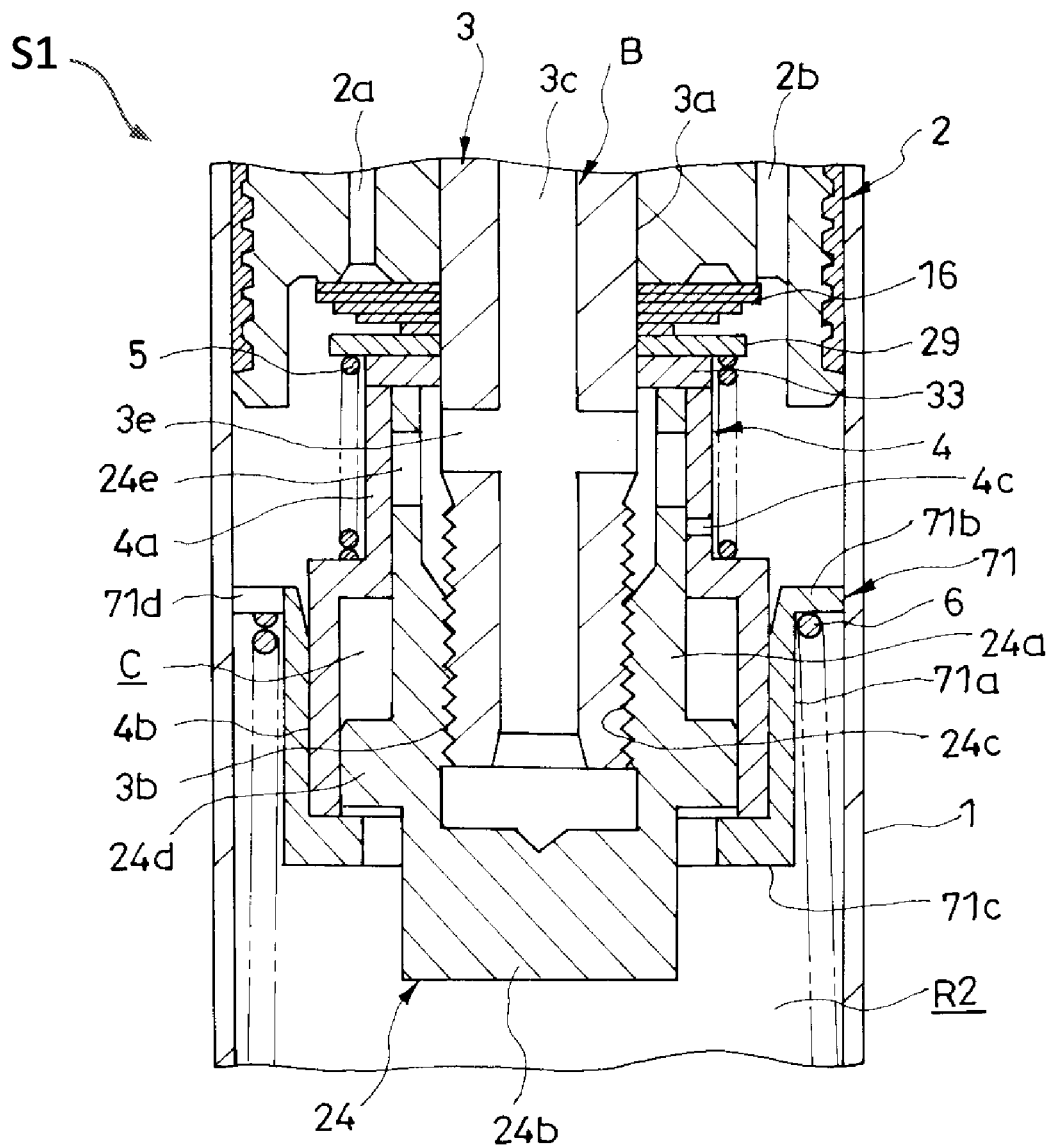
FIG. 2 is a partially enlarged cross-sectional view illustrating a modification of the shock absorber.

It should be noted that, the structure of a guide ring 71 may be configured like a shock absorber S1 as illustrated in FIG. 2. The shock absorber 51 uses the members identical to the members of the shock absorber S other than the guide ring 71. To avoid an overlapping description, like reference numerals designate identical elements, and therefore such elements will not be further elaborated here.

The guide ring 71 is configured with a tubular link portion 71a, a guiding portion 71b, and a collision portion 71c. The link portion 71a is inserted into the control spring 6. The guiding portion 71 outwardly projects from the one end of the link portion 71a to be slidably in contact with the inner periphery of the cylinder 1. The guiding portion 71b is also supported to the small-diameter side end of the control spring 6. The collision portion 71c inwardly projects from the other end of the link portion 71a and is opposed to the lower end in FIG. 2 of the shutter 4.

The collision portion 71c has an annular shape. The inner diameter of the collision portion 71c is set lager than the outer diameter of the lower end in FIG. 2 of the piston nut 24. This configuration prevents interference between the guide ring 71 and the piston nut 24.

The guiding portion 71b has a cutout 71d. The cutout 71d is to prevent forming a closed space below in FIG. 2 in the compression-side chamber R2 by the guiding portion 71b and the shutter 4 when the guiding portion 71b abuts against the shutter 4 and adversely affecting the operation of the shock absorber S1.

This allows the control spring 6 to be arranged upward in FIG. 2 with respect to the cylinder 1 compared with the shock absorber S. This allows shorting the lower side in FIG. 2 of the cylinder 1. Insofar as the identical stroke length is ensured, the overall length of the shock absorber S1 can be shorter than the overall length of the shock absorber S.

Figure 3:
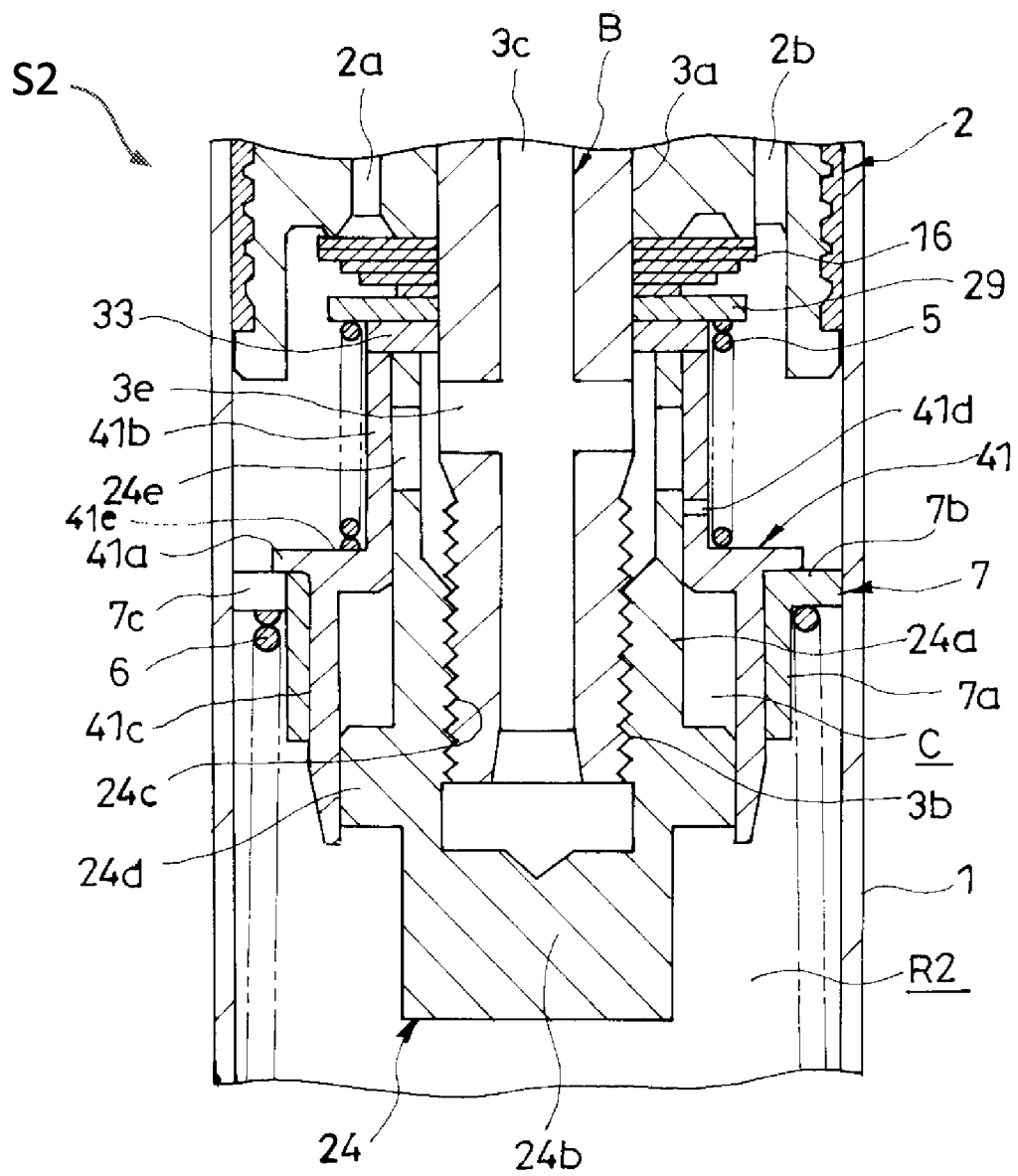
FIG. 3 is a partially enlarged cross-sectional view illustrating another modification of the shock absorber.

The structure of a shutter 41 may be configured like a shock absorber S2 illustrated in FIG. 3. The shock absorber S2 uses the members identical to the members of the shock absorber S other than the shutter 41. To avoid an overlapping description, like reference numerals designate identical elements, and therefore such elements will not be further elaborated here.

The shutter 41 has a tubular shape. The shutter 41 includes a collar portion 41a at the intermediate portion on the outer periphery. The collar portion 41a projects outward. In more details, the shutter 41 is configured by a small-diameter pipe portion 41b, a large-diameter pipe portion 41c, the collar portion 41a, and a reduced passage 41d. The small-diameter pipe portion 41b is on the upper end side in FIG. 3. Continuous from the small-diameter pipe portion 41b, the large-diameter pipe portion 41c is disposed on the lower side in FIG. 3. The collar portion 41a projects outward from the outer periphery of the upper end in FIG. 3 of the large-diameter pipe portion 41c. The reduced passage 41d communicates between the inner peripheral side and the outer periphery side of the small-diameter pipe portion 41b.

The shutter 41 brings the small-diameter pipe portion 41b slidably in contact with the outer periphery of the pipe portion 24a of the piston nut 24 and upward in FIG. 3 with respect to the flange 24d. Additionally, the shutter 41 brings the large-diameter pipe portion 41c slidably in contact with the outer periphery of the flange 24d. Thus, the shutter 41 is mounted to the outer periphery of the piston nut 24.

Thus, the shock absorber S2 includes the collar portion 41a at the intermediate portion on the outer periphery of the shutter 41 to cause the guiding portion 7b of the guide ring 7 to abut against the collar portion 41a. In more details, the shock absorber S2 brings the inner periphery of the press-fitted portion 7a into sliding contact with the outer periphery of the large-diameter pipe portion 41c or sets the inner diameter of the press-fitted portion 7a larger than the outer diameter of the large-diameter pipe portion 41c to allow the guide ring 7 to abut against the collar portion 41a.

This allows the control spring 6 to be arranged upward in FIG. 3 with respect to the cylinder 1 compared with the shock absorber S. This allows shorting the lower side in FIG. 3 of the cylinder 1. Insofar as the identical stroke length is ensured, the overall length of the shock absorber S2 can be shorter than the overall length of the shock absorber S.

Since the coil spring 5 is interposed between a stepped portion 41e, which is disposed between the large-diameter pipe portion 41c and the small-diameter pipe portion 41b, and the valve stopper 29, the collar portion 41a is disposed at the outer periphery of the large-diameter pipe portion 41c. However, in the case where a disc spring or a similar spring as the biasing member is interposed between the upper end in FIG. 3 of the small-diameter pipe portion 41b and the valve stopper 29, disposing the collar portion 41a at the outer periphery of the small-diameter pipe portion 41b is also possible.

Embodiments of this invention were described above, but the above embodiments are merely examples of applications of this invention, and the technical scope of this invention is not limited to the specific constitutions of the above embodiments.

With respect to the above description, the contents of application No. 2012-281971, with a filing date of Dec. 26, 2012 in Japan, are incorporated herein by reference.

The invention claimed is:

1. A shock absorber comprising:
   a cylinder;
   a piston slidably inserted in the cylinder, the piston partitioning the inside of the cylinder with an expansion-side chamber and a compression-side chamber;
   a piston rod movably inserted into the cylinder, the piston rod being coupled to the piston;

a damping passage disposed at the piston, the damping passage communicating between the expansion-side chamber and the compression-side chamber;

a bypass path that bypasses the damping passage, the bypass path communicating between the expansion-side chamber and the compression-side chamber via an inside of the piston rod;

a shutter movably mounted to the piston rod in an axial direction, the shutter opening and closing the bypass path;

a biasing member that biases the shutter to a direction of opening the bypass path; and a control spring secured to the cylinder by one end, another end of the control spring being opposed to the shutter, wherein when the piston exceeds a predetermined position with respect to the cylinder by displacing on the compression-side chamber side, the shutter is pushed by the control spring and closes the bypass path, the control spring is a conical coil spring, the other end side of the control spring having a small diameter, and a guide ring, which is slidably in contact with an inner periphery of the cylinder, is mounted to the small-diameter side end of the control spring.

2. The shock absorber according to claim 1, wherein the guide ring is made of synthetic resin, and the control spring pushes the shutter via the guide ring.

3. The shock absorber according to claim 1, further comprising an expansion-side damping valve and a compression-side damping valve disposed at the bypass path.

4. The shock absorber according to claim 1, wherein the guide ring includes:
   a tubular link portion inserted in the control spring;
   a guiding portion that outwardly projects from one end of the link portion to be slidably in contact with the inner periphery of the cylinder, the guiding portion being supported to a small-diameter side end of the control spring; and
   a collision portion that inwardly projects from another end of the link portion, the collision portion being opposed to an end portion of the shutter.

5. The shock absorber according to claim 1, wherein the shutter has a tubular shape, the shutter including a collar portion at an intermediate portion on an outer periphery, the collar portion projecting outward, and the control spring causes the guide ring to abut against the collar portion to push the shutter.

6. The shock absorber according to claim 1, further comprising
   a shutter supporting member in a shape of a cylinder with a closed bottom, the shutter supporting member being disposed at a distal end of the piston rod, wherein
   an outlet end of the bypass path is disposed at a pipe portion of the shutter supporting member;
   the shutter is slidably installed to an outer periphery of the shutter supporting member, the shutter opening and closing the outlet end of the bypass path,
   a sump chamber is disposed between the shutter and the shutter supporting member, a volume of the sump chamber being expanded and contracted by a relative movement between the shutter and the shutter supporting member in an axial direction, and
   the shutter includes a reduced passage, the reduced passage communicating between the sump chamber and the compression-side chamber.

7. The shock absorber according to claim 6, wherein the damping passages are an expansion-side piston passage and a compression-side piston passage disposed at the piston,
the shock absorber further includes:
   an expansion-side leaf valve stacked on the piston, the expansion-side leaf valve being mounted to an outer periphery of the piston rod, the expansion-side leaf valve opening and closing an outlet end of the expansion-side piston passage; and
   a compression-side leaf valve stacked on the piston, the compression-side leaf valve being mounted to the outer periphery of the piston rod, the compression-side leaf valve opening and closing an outlet end of the compression-side piston passage, and
the shutter supporting member secures the compression-side leaf valve, the piston, and the expansion-side leaf valve to the piston rod.

* * * * *